United States Patent
Hatano et al.

(10) Patent No.: US 12,285,080 B2
(45) Date of Patent: Apr. 29, 2025

(54) DATA GENERATING APPARATUS, SHOE LAST PRODUCING SYSTEM AND DATA GENERATING METHOD

(71) Applicant: ASICS CORPORATION, Kobe (JP)

(72) Inventors: Genki Hatano, Kobe (JP); Shingo Takashima, Kobe (JP); Yuya Kozuka, Kobe (JP); Satoru Abe, Kobe (JP); Kenta Takahama, Kobe (JP)

(73) Assignee: ASICS CORPORATION, Kobe (JP)

( * ) Notice: Subject to any disclaimer, the term of this patent is extended or adjusted under 35 U.S.C. 154(b) by 708 days.

(21) Appl. No.: 17/406,237

(22) Filed: Aug. 19, 2021

(65) Prior Publication Data

US 2022/0071356 A1 Mar. 10, 2022

(30) Foreign Application Priority Data

Sep. 4, 2020 (JP) .................................. 2020-148648

(51) Int. Cl.
*A43D 1/02* (2006.01)
*A43B 5/00* (2022.01)
(Continued)

(52) U.S. Cl.
CPC .................. *A43D 1/02* (2013.01); *A43B 5/00* (2013.01); *A43D 1/04* (2013.01); *G06F 30/20* (2020.01); *G06F 2111/16* (2020.01)

(58) Field of Classification Search
CPC ........ A43D 1/02; A43D 1/04; A43D 2200/60; A43D 1/025; A43B 5/00; G06F 30/20;
(Continued)

(56) References Cited

U.S. PATENT DOCUMENTS 6,957,165 B2* 10/2005 Gislason .................. A43D 1/02
702/155
8,380,586 B2* 2/2013 Paolini ..................... A43D 1/02
705/26.7
(Continued)

FOREIGN PATENT DOCUMENTS

EP 1345006 A1 9/2003
JP 2000296005 A * 10/2000
(Continued)

OTHER PUBLICATIONS

The extended European search report issued by the European Patent Office on Jan. 25, 2022, which corresponds to European Patent Application No. 21188629.6-1005 and is related to U.S. Appl. No. 17/406,237.
(Continued)

*Primary Examiner* — Yaritza Guadalupe-McCall
(74) *Attorney, Agent, or Firm* — Studebaker Brackett PLLC

(57) ABSTRACT

A data generating apparatus generates shoe last data for manufacturing a shoe from measured foot shape data. The data generating apparatus includes: an input unit that receives the foot shape data; a processor that computes the shoe last data from the foot shape data received by the input unit; and an output unit that outputs the shoe last data computed by the processor. The input unit further receives selected additional information. The processor specifies a portion of the shoe last data to be corrected, based on the additional information, and calculates an amount of correction of the specified portion based on the additional information.

20 Claims, 12 Drawing Sheets

(51) Int. Cl.
*A43D 1/04* (2006.01)
*G06F 30/20* (2020.01)
*G06F 111/16* (2020.01)

(58) Field of Classification Search
CPC ... G06F 2111/16; G06F 2111/10; G06T 17/00
See application file for complete search history.

(56) References Cited

U.S. PATENT DOCUMENTS

| | | | | |
|---|---|---|---|---|
| 8,406,454 | B2* | 3/2013 | Bar | A43D 1/022 |
| | | | | 382/100 |
| 8,768,786 | B2* | 7/2014 | Paolini | G06Q 30/0603 |
| | | | | 705/26.7 |
| 9,648,926 | B2* | 5/2017 | Marks | G06Q 30/0631 |
| 9,779,447 | B2* | 10/2017 | Paolini | G06Q 30/0621 |
| 10,067,500 | B2* | 9/2018 | Hargovan | A43B 17/00 |
| 10,366,524 | B2* | 7/2019 | Andon | G06V 40/10 |
| 10,463,110 | B2* | 11/2019 | Golub | A43D 1/025 |
| 10,564,628 | B2* | 2/2020 | Hargovan | G06T 19/20 |
| 11,164,237 | B2* | 11/2021 | Crabtree | G06Q 30/0631 |
| 11,178,938 | B2* | 11/2021 | Kulenko | A43D 1/02 |
| 11,610,251 | B2* | 3/2023 | Crabtree | G06Q 30/0201 |
| 11,678,724 | B2* | 6/2023 | Lopez | A43D 3/027 |
| | | | | 12/134 |
| 11,763,365 | B2* | 9/2023 | Bleicher | G01B 11/22 |
| | | | | 705/26.41 |
| 11,861,673 | B2* | 1/2024 | Bleicher | G06Q 30/0643 |
| 12,048,356 | B2* | 7/2024 | Hatano | A43B 1/028 |
| 2004/0168329 | A1* | 9/2004 | Ishimaru | A43D 1/025 |
| | | | | 33/3 R |
| 2014/0096403 | A1* | 4/2014 | Regan | A43D 25/06 |
| | | | | 33/6 |
| 2016/0081435 | A1* | 3/2016 | Marks | A43D 1/02 |
| | | | | 382/154 |
| 2016/0166011 | A1* | 6/2016 | Bruce | A43B 23/0205 |
| | | | | 12/145 |
| 2018/0047199 | A1* | 2/2018 | Andon | G06Q 30/0631 |
| 2018/0311013 | A1* | 11/2018 | Tanikawa | G16H 30/40 |
| 2019/0034996 | A1* | 1/2019 | Golub | G06Q 30/0631 |
| 2019/0188784 | A1* | 6/2019 | Bleicher | G06F 16/00 |
| 2019/0228448 | A1* | 7/2019 | Bleicher | G06Q 30/0631 |
| 2022/0071356 | A1* | 3/2022 | Hatano | A43B 5/00 |
| 2022/0225738 | A1* | 7/2022 | Hatano | A43D 1/025 |
| 2022/0240628 | A1* | 8/2022 | Kozuka | A43D 8/12 |
| 2023/0078348 | A1* | 3/2023 | Kozuka | A43D 999/00 |
| | | | | 700/160 |
| 2023/0206305 | A1* | 6/2023 | Crabtree | G06Q 30/0282 |
| | | | | 705/26.7 |
| 2023/0270212 | A1* | 8/2023 | Oshima | A43D 3/02 |
| | | | | 382/154 |
| 2024/0078584 | A1* | 3/2024 | Bleicher | G06Q 30/0627 |

FOREIGN PATENT DOCUMENTS

| | | | | |
|---|---|---|---|---|
| JP | WO2002040941 A1 | * | 11/2000 | |
| JP | 2001-204512 A | | 7/2001 | |
| JP | 6685303 B2 | | 4/2020 | |
| JP | 7268089 B2 | * | 5/2023 | A43D 1/025 |
| WO | WO-0240941 A1 | * | 5/2002 | A43D 1/02 |
| WO | 2003/103433 A1 | | 12/2003 | |
| WO | WO-2008070537 A2 | * | 6/2008 | A43D 1/025 |
| WO | WO-2016191109 A1 | * | 12/2016 | A43B 13/14 |
| WO | 2017/069231 A1 | | 4/2017 | |

OTHER PUBLICATIONS

Communication pursuant to Article 94(3) EPC issued by the European Patent Office on Aug. 3, 2022, which corresponds to European Patent Application No. 21 188 629.6-1015 and is related to U.S. Appl. No. 17/406,237.

An Office Action; "Notice of Reasons for Refusal," mailed by the Japanese Patent Office on Jan. 9, 2024, which corresponds to Japanese Patent Application No. 2020-148648 and is related to U.S. Appl. No. 17/406,237; with English language translation.

* cited by examiner

FIG.8

| ADDITIONAL INFORMATION | FACTUAL INFORMATION | SELECTIVE INFORMATION |
|---|---|---|
| USER'S TASTE (INTERVIEW RESULT) | | ○ |
| EXISTING SHOE PREFERENCE | | ○ |
| 3D DATA OF EXISTING SHOE | ○ | |
| PREVIOUSLY-GENERATED LAST DATA | ○ | |
| HEIGHT OF WEARING OPENING | | ○ |
| MATERIAL OF UPPER | | ○ |
| SHAPE OF SOLE | ○ | |
| RUNNING DATA | ○ | ○ |
| TARGET SPORT | | ○ |
| TARGET SPEED | ○ | ○ |
| COMPRESSION PRESSURE (MEASURED BY SENSOR) | ○ | |
| PLANTAR PRESSURE DATA | ○ | |
| PRONATION DATA | ○ | |

DATA GENERATING APPARATUS, SHOE LAST PRODUCING SYSTEM AND DATA GENERATING METHOD

This nonprovisional application is based on Japanese Patent Application No. 2020-148648 filed on Sep. 4, 2020 with the Japan Patent Office, the entire contents of which are hereby incorporated by reference.

BACKGROUND OF THE INVENTION

Field of the Invention

The present disclosure relates to a data generating apparatus, a shoe last producing system and a data generating method.

Description of the Background Art

When a custom-made shoe tailored to a foot of a user is manufactured, a foot shape is measured using a measuring apparatus, and shoe last data is generated based on the obtained foot shape data. Based on the generated shoe last data, a shoe last for manufacturing the shoe is produced (e.g., Japanese Patent No. 6685303).

SUMMARY OF THE INVENTION

Since the shoe last data is generated based on the foot shape data obtained by measuring the foot shape using the measuring apparatus, a dedicated shoe last that reflects a shape of a foot of each individual can be produced. However, information about a foot that can be measured using the measuring apparatus is limited to information about a foot size and a foot shape. Therefore, even when a custom-made shoe is manufactured using the shoe last produced based on the information, the shoe cannot in some cases have a fitting feeling that satisfies the user.

An object of the present disclosure is to provide a data generating apparatus, a shoe last producing system and a data generating method, which generate shoe last data for manufacturing a shoe having a fitting feeling that satisfies a user.

A data generating apparatus according to an aspect of the present disclosure generates shoe last data for manufacturing a shoe from measured foot shape data. The data generating apparatus includes: an input unit that receives the foot shape data; a computing unit that computes the shoe last data from the foot shape data received by the input unit; and an output unit that outputs the shoe last data computed by the computing unit. The input unit further receives selected additional information. The computing unit specifies a portion of the shoe last data to be corrected, based on the additional information, and calculates an amount of correction of the specified portion based on the additional information.

A shoe last producing system according to an aspect of the present disclosure includes: a measuring apparatus that measures a foot shape and outputs the foot shape data to the data generating apparatus; the data generating apparatus described above; and a shoe last producing apparatus that produces a shoe last based on the shoe last data generated by the data generating apparatus.

A data generating method according to an aspect of the present disclosure generates shoe last data for manufacturing a shoe from measured foot shape data. The data generating method includes: receiving the foot shape data; further receiving selected additional information; computing the shoe last data from the foot shape data; specifying a portion of the shoe last data to be corrected, based on the additional information; calculating an amount of correction of the specified portion based on the additional information; computing the shoe last data including the specified portion corrected in accordance with the calculated amount of correction; and outputting the computed shoe last data.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 shows a list of additional information reflected in the shoe last data.

DESCRIPTION OF THE PREFERRED EMBODIMENTS

Figure 1:
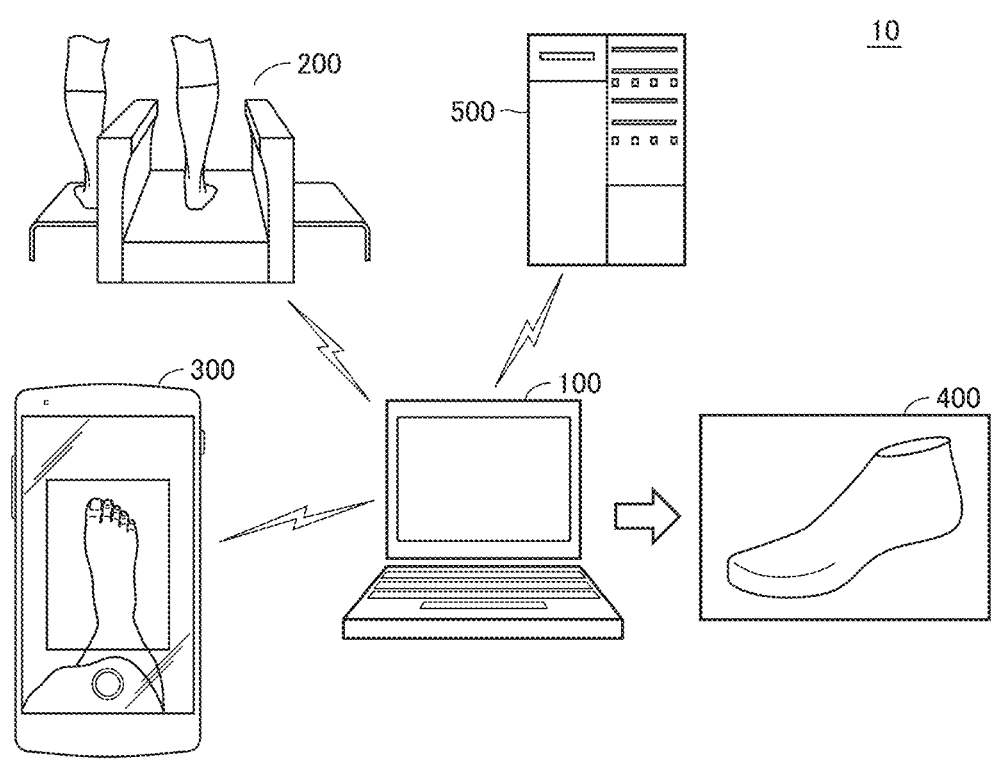
FIG. 1 is a schematic view showing a configuration example of a shoe last producing system according to a first embodiment.

Embodiments will be described hereinafter with reference to the drawings. In the following description, the same components are denoted by the same reference characters. Their names and functions are also the same. Therefore, a detailed description about them will not be repeated.

First Embodiment

In a first embodiment, an example of application of the present disclosure will be described. First, in the first embodiment, a shoe last producing system will be described, which when manufacturing a custom-made shoe tailored to a foot of a user at, for example, a store, generates shoe last data based on foot shape data obtained by measuring a foot shape using a measuring apparatus, and produces a shoe last for manufacturing the shoe based on the generated shoe last data.

FIG. 1 is a schematic view showing a configuration example of a shoe last producing system 10 according to the first embodiment. Referring to FIG. 1, the shoe last producing system 10 includes a data generating apparatus 100, a measuring apparatus 200 that measures a foot shape, and a shoe last producing apparatus 400 that produces a shoe last based on shoe last data. Depending on stores, or at a remote location such as a user's house, the foot shape may be measured using a mobile terminal 300 such as a smartphone, instead of the measuring apparatus 200. The data generating apparatus 100 can communicate with a data server 500 placed inside or outside a store.

Figure 2:
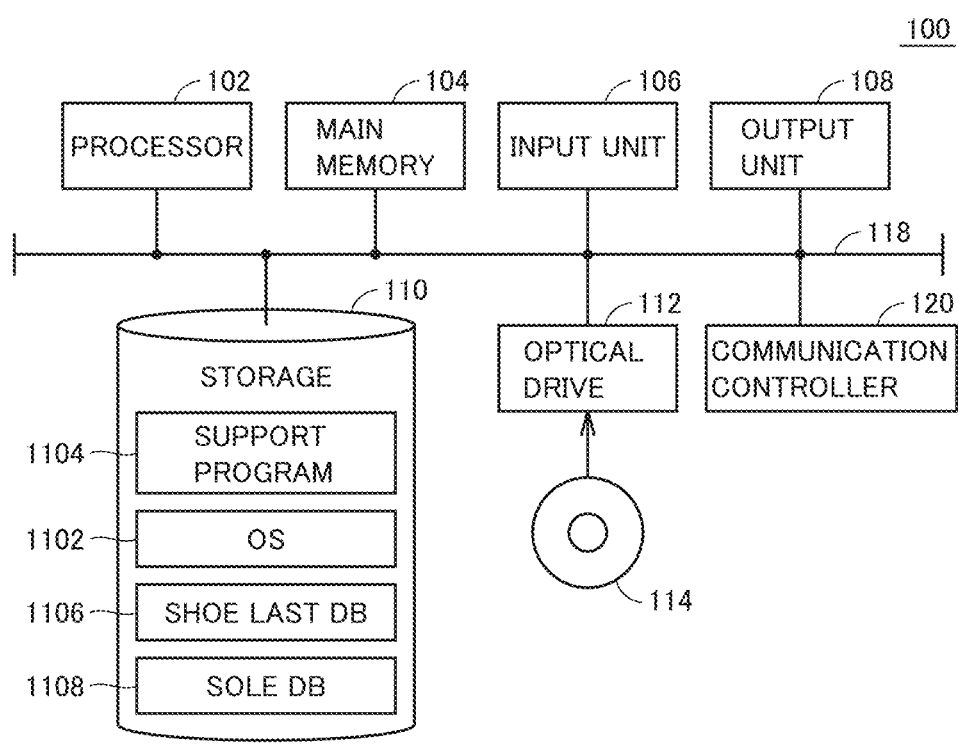
FIG. 2 is a schematic view showing a hardware configuration example of a data generating apparatus according to the first embodiment.

The data generating apparatus 100 generates shoe last data based on the foot shape data obtained from the measuring apparatus 200 or the mobile terminal 300. FIG. 2 is a schematic view showing a hardware configuration example of the data generating apparatus 100 according to the first embodiment. Referring to FIG. 2, the data generating apparatus 100 includes a processor 102, a main memory 104, an input unit 106, an output unit 108, a storage 110, an optical drive 112, and a communication controller 120. These components are connected through a processor bus 118.

The processor 102 is implemented by a CPU, a GPU or the like, and can read programs (by way of example, an OS 1102 and a processing program 1104) stored in the storage 110 and deploy the programs in the main memory 104 for execution. The processor 102 executes the processing program 1104 that computes the shoe last data from the foot shape data and additional information received by the input unit 106, based on a prescribed algorithm. The processor 102 that executes the processing program 1104 corresponds to a computing unit of the data generating apparatus 100.

The main memory 104 is implemented by, for example, a volatile storage device such as a DRAM or an SRAM. The storage 110 is implemented by, for example, a non-volatile storage device such as an HDD or an SSD.

In addition to the OS 1102 for implementing a basic function, the processing program 1104 for providing a function as the data generating apparatus 100 is stored in the storage 110. That is, the processing program 1104 is executed by the processor 102 of the data generating apparatus 100, to thereby compute the shoe last data from the foot shape data. Furthermore, a shoe last database 1106 including a plurality of pieces of shoe last data, and a sole database 1108 including a plurality of pieces of sole data corresponding to a sole-side region of a shoe are stored in the storage 110. Only a plurality of pieces of upper data corresponding to an upper-side region of a shoe may be stored in the shoe last database 1106 as the shoe last data. Only the frequently-used data in the shoe last database 1106 and the sole database 1108 may be stored in the storage 110, and the other data may be stored in the data server 500. Alternatively, only lists may be stored in the shoe last database 1106 and the sole database 1108, and the plurality of pieces of shoe last data and the plurality of pieces of sole data themselves may be stored in the data server 500.

The input unit 106 includes an input interface connected to the measuring apparatus 200 or the mobile terminal 300 to receive the foot shape data from the measuring apparatus 200 or the mobile terminal 300. The input unit 106 is implemented by a keyboard, a mouse, a microphone, a touch device or the like, and can further receive the additional information selected by the user. Although the additional information will be described in detail below, the additional information refers to information other than information about a foot size and a foot shape.

The output unit 108 includes an output interface that outputs the shoe last data computed by the processor 102 to the shoe last producing apparatus 400. The output unit 108 is implemented by a display, various indicators, a printer or the like, and outputs a processing result or the like from the processor 102.

The communication controller 120 exchanges data with another control device or the like by using wired or wireless communication. The data generating apparatus 100 may exchange the foot shape data and the additional information with the measuring apparatus 200 or the mobile terminal 300 through the communication controller 120, and may exchange the shoe last data with the shoe last producing apparatus 400 through the communication controller 120. In addition to the communication controller 120, a USB controller connected to the processor bus 118 may be provided to exchange the data with another control device or the like through USB connection.

The data generating apparatus 100 includes the optical drive 112 that may read a computer-readable program stored in a recording medium 114 (e.g., optical recording medium such as a digital versatile disc (DVD)) in a non-transitory manner, and install the program in the storage 110 or the like.

Although the processing program 1104 and the like executed in the data generating apparatus 100 may be installed through computer-readable recording medium 114, the processing program 1104 and the like may be installed by being downloaded from a server device or the like on a network. In addition, the functions provided by the data generating apparatus 100 according to the first embodiment may be implemented by using a part of a module provided by the OS.

Although FIG. 2 shows the configuration example in which the processor 102 executes the programs to thereby provide the functions required as the data generating apparatus 100, a part or all of these provided functions may be implemented by using a dedicated hardware circuit (such as, for example, an ASIC or an FPGA). The configuration of the data generating apparatus 100 shown in FIG. 2 is illustrative and the present disclosure is not limited to this configuration.

The measuring apparatus 200 is implemented by a three-dimensional foot shape scanner using laser measurement. A laser measurement apparatus that is built into walls provided on both sides of a foot put on a top board measures the foot while moving from a toe to a heel of the foot, thereby obtaining three-dimensional foot shape data of the user. A measurement method or the like of the measuring apparatus 200 is not particularly limited, as long as it can measure the three-dimensional foot shape data. The mobile terminal 300 such as a smartphone may also be used to capture an image of the foot of the user and obtain image data of the foot, and the foot shape data may be generated from the obtained image data of the foot through preliminarily installed software.

Figure 3A:
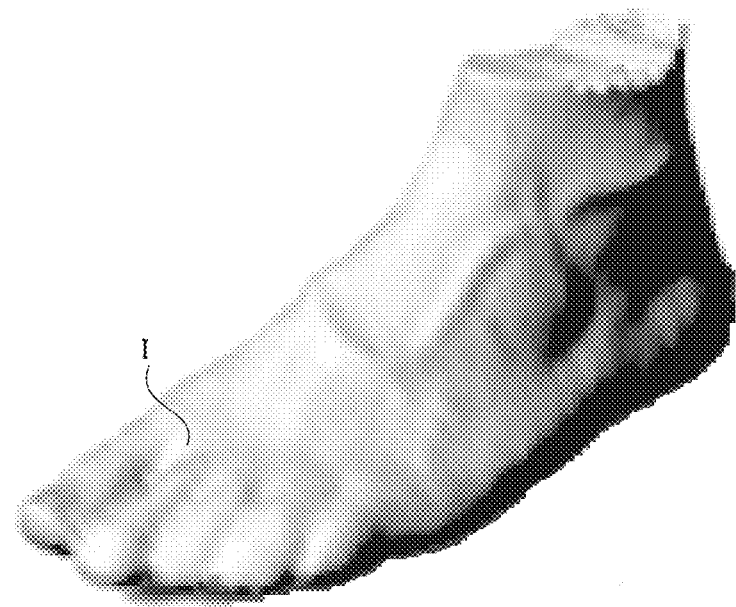
FIG. 3A is a perspective view of three-dimensional foot shape data obtained by measurement using a measuring apparatus or a mobile terminal.
Figure 3B:
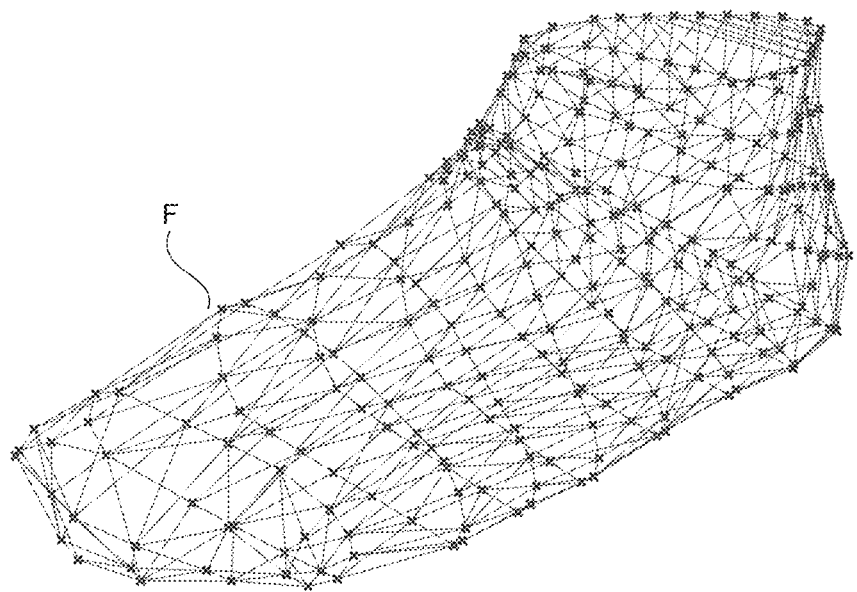
FIG. 3B is a schematic view of the foot shape data converted into data based on a homologous model.

FIGS. 3A and 3B are schematic views of foot shape data. FIG. 3A is a perspective view of three-dimensional foot shape data I obtained by measurement using the measuring apparatus 200 or the mobile terminal 300. An amount of foot shape data I shown in FIG. 3A is large, although it depends on a resolution. Therefore, the measuring apparatus 200 or the mobile terminal 300 does not transmit three-dimensional foot shape data I as it is to the data generating apparatus 100, but converts three-dimensional foot shape data I into foot shape data F based on a homologous model shown in FIG. 3B and transmits foot shape data F to the data generating apparatus 100. Foot shape data F based on the homologous model herein refers to foot shape data that represents a foot shape by a polyhedron having an identical-phase geometric structure, using anatomically associated two hundred and ninety-five data points. The foot shape data is not limited to foot shape data F based on the homologous model, and may be foot shape data based on a model created by dividing a foot shape into a plurality of prescribed cross sections and connecting a plurality of representative points specified within the cross sections, as long as it can represent an object shape of foot shape data I shown in FIG. 3A.

Although the description has been given of the example in which the measuring apparatus 200 or the mobile terminal 300 converts three-dimensional foot shape data I into foot shape data F based on the homologous model, the data generating apparatus 100 may convert three-dimensional foot shape data I into foot shape data F based on the homologous model. Alternatively, the mobile terminal 300 may only capture the image of the foot of the user and obtain the image data of the foot without generating the foot shape data, and the data generating apparatus 100 may generate the foot shape data based on the image data of the foot obtained by the mobile terminal 300.

The shoe last producing apparatus 400 is implemented by a 3D printer, a computerized numerical control (CNC) machine tool or the like that produces a shoe last based on shoe last data. When the shoe last producing apparatus 400 is implemented by a 3D printer, a three-dimensional shoe last made of resin is produced based on the shoe last data generated by the data generating apparatus 100. The material of the produced shoe last is not limited to resin, and may be cardboard or the like. When the shoe last is made of cardboard, the shoe last producing apparatus 400 may be an apparatus that cuts the cardboard, or an apparatus that outputs a cardboard cutting shape pattern. When the shoe last is variable in shape, the shoe last producing apparatus 400 is an apparatus that varies the shoe last based on the shoe last data generated by the data generating apparatus 100.

When the data generating apparatus 100 simply generates the shoe last data from the foot shape data obtained by the measuring apparatus 200 or the mobile terminal 300, information reflected in the shoe last data is limited to information about a foot size and a foot shape. Therefore, even when a custom-made shoe is manufactured using a shoe last produced based on the information, the shoe cannot in some cases have a fitting feeling that satisfies the user. Thus, in the data generating apparatus 100, the input unit 106 further receives selected additional information, and the computing unit specifies a portion of the shoe last data to be corrected, based on the additional information and calculates an amount of correction of the specified portion based on the additional information, thereby generating the shoe last data. That is, the data generating apparatus 100 reflects the additional information in the shoe last data, in addition to the information about the foot size and the foot shape. The additional information includes at least one of information about a shape of the shoe, information about the use of the shoe, and information about the foot of the user.

Figure 4:
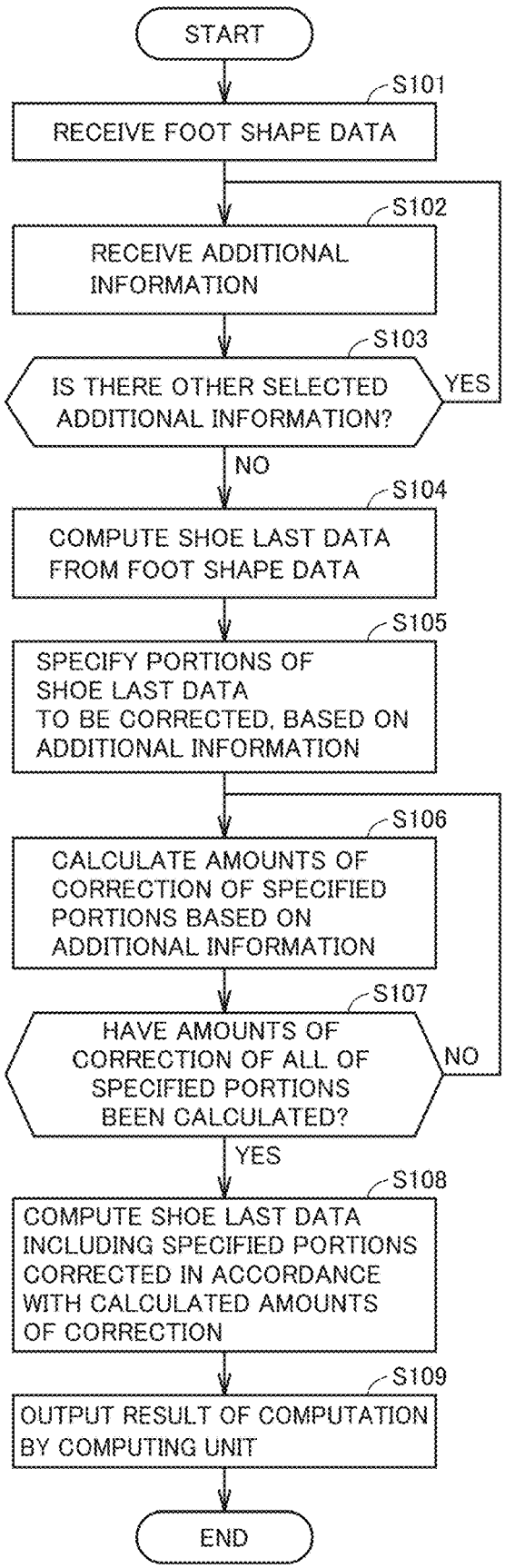
FIG. 4 is a flowchart for illustrating the way the data generating apparatus according to the first embodiment generates shoe last data from the foot shape data.

A description will be given below of an example in which the data generating apparatus 100 generates the shoe last data in which information about user's preference, of the information about the shape of the shoe, is reflected. FIG. 4 is a flowchart for illustrating the way the data generating apparatus 100 according to the first embodiment generates the shoe last data from the foot shape data. First, the data generating apparatus 100 receives the foot shape data obtained by the measuring apparatus 200 or the mobile terminal 300 (step S101).

Figure 5:
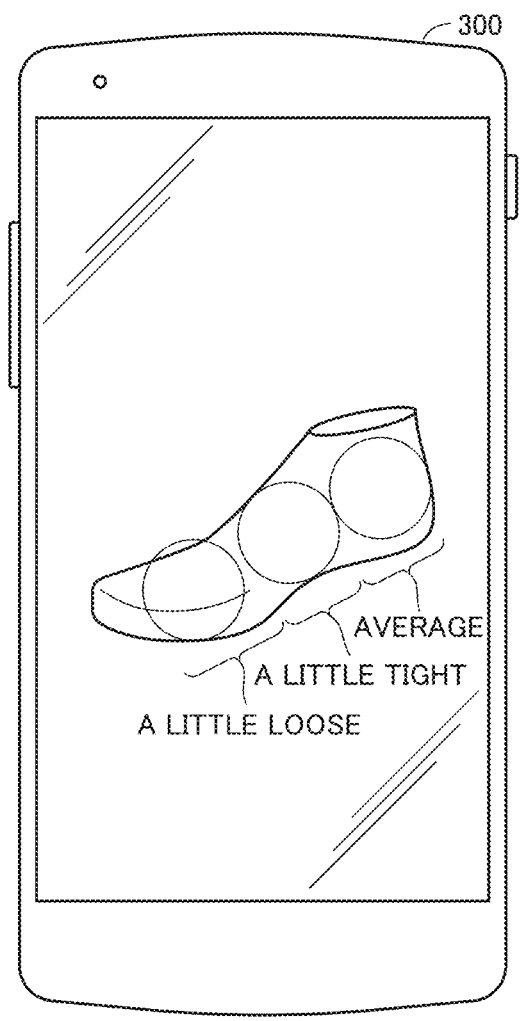
FIG. 5 shows an example of a user's preference about a shape of a shoe input by a user using a mobile terminal.

In the presence of the additional information selected by the user, the data generating apparatus 100 receives the additional information (step S102). Specifically, the data generating apparatus 100 receives a user's preference about the shape of the shoe as the additional information. FIG. 5 shows an example of the user's preference about the shape of the shoe input by the user using the mobile terminal 300. A shoe last is displayed on the mobile terminal 300 shown in FIG. 5, and "a little loose" is input as a user's preference about a shape of a toe area of the shoe last, "a little tight" is input as a user's preference about a shape of a midfoot portion area of the shoe last, and "average" is input as a user's preference about a shape of a heel area of the shoe last. By allowing the user to easily input the user's preference using the mobile terminal 300 as in FIG. 5, the preference about the shape of the shoe can be easily grasped for each area.

The data generating apparatus 100 can generate the shoe last data in which the information (additional information) on the user's preference about the shape of the shoe input by the user for each area is reflected. The information reflected in the shoe last data is not limited to one piece of information, and a plurality of pieces of information may be reflected. Referring again to FIG. 4, the data generating apparatus 100 determines whether or not there is other additional information selected by the user (step S103). When there is other selected additional information (YES in step S103), the data generating apparatus 100 returns the process to step S102 and receives the other selected additional information.

Figure 6:
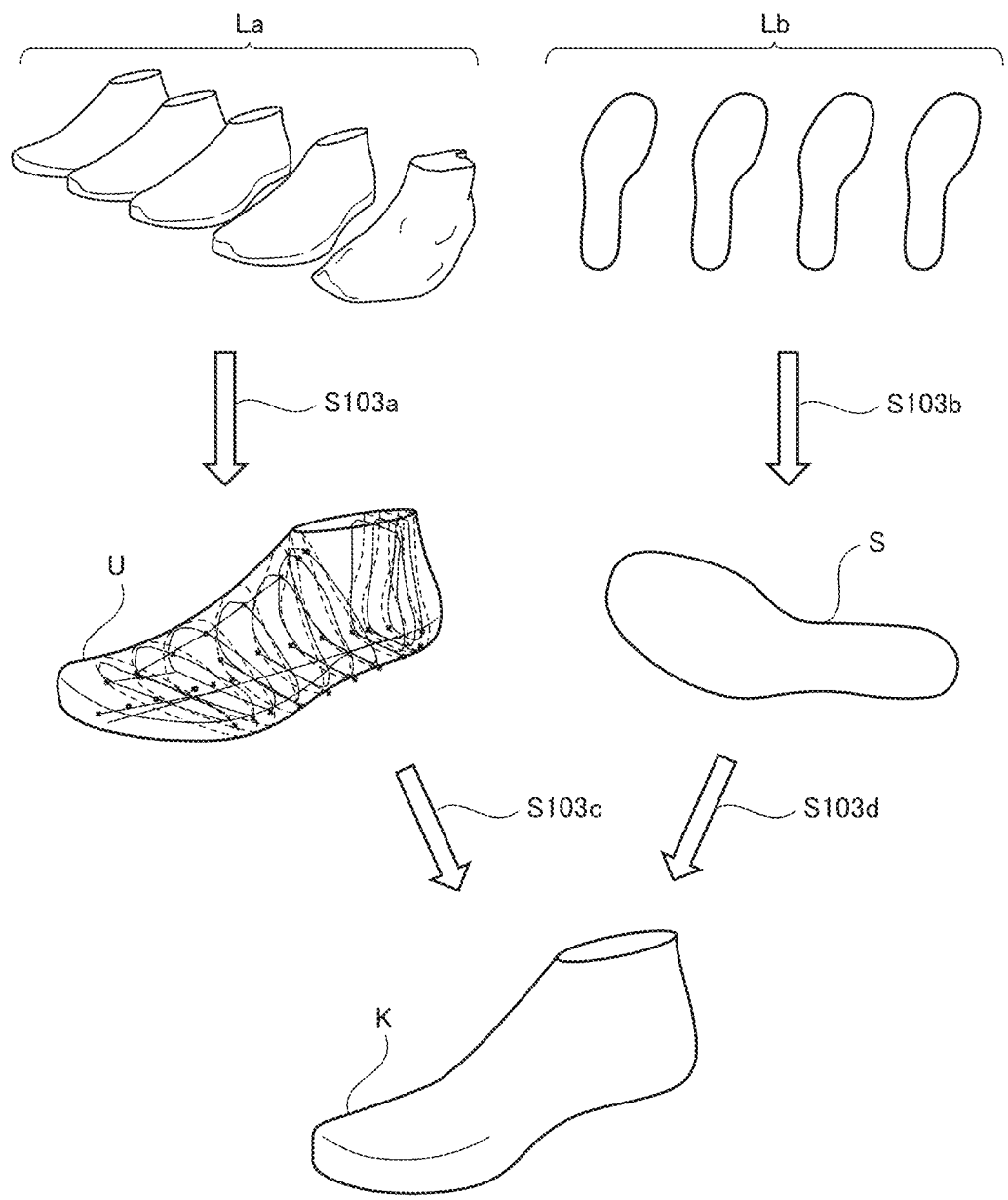
FIG. 6 is a schematic view for illustrating how the data generating apparatus according to the first embodiment computes the shoe last data.

When there is no other selected additional information (NO in step S103), the data generating apparatus 100 computes shoe last data from the foot shape data (step S104). FIG. 6 is a schematic view for illustrating how the data generating apparatus 100 according to the first embodiment computes the shoe last data. First, the data generating apparatus 100 selects shoe last data U close to the foot shape data from a library La of a plurality of pieces of shoe last data stored in the shoe last database 1106 (step S104a). In addition, the data generating apparatus 100 selects sole data predetermined by the shoe to be manufactured or sole data selected by the user from a library Lb of a plurality of pieces of sole data stored in the sole database 1108 (step S104b).

The data generating apparatus 100 corrects a portion (e.g., a surface portion of an instep portion) of selected shoe last data U that is different from the foot shape data (step S104c). In addition, the data generating apparatus 100 makes a correction such that selected sole data S matches selected shoe last data U (step S104d). The data generating apparatus 100 combines corrected shoe last data U and corrected sole data S to generate shoe last data K. Shoe last data K corresponds to the shoe last data computed and generated from the foot shape data in step S104.

FIG. 6 shows the example of separately selecting and combining shoe last data U and sole data S. However, the data generating apparatus 100 may select only the shoe last data close to the foot shape data from the library that stores the plurality of pieces of shoe last data, corrects upper data corresponding to an upper-side region, of the selected shoe last data, so as to match the foot shape data, and use sole data corresponding to a sole-side region as it is. As a matter of course, the data generating apparatus 100 may correct the upper data corresponding to the upper-side region, of the selected shoe last data, so as to match the foot shape data, and correct the sole data corresponding to the sole-side region so as to match the sole data selected by the user. Instead of selecting the data from the library stored in the database and correcting the data, the data generating apparatus 100 may compute and generate shoe last data K from the foot shape data based on a prescribed algorithm.

Figure 7:
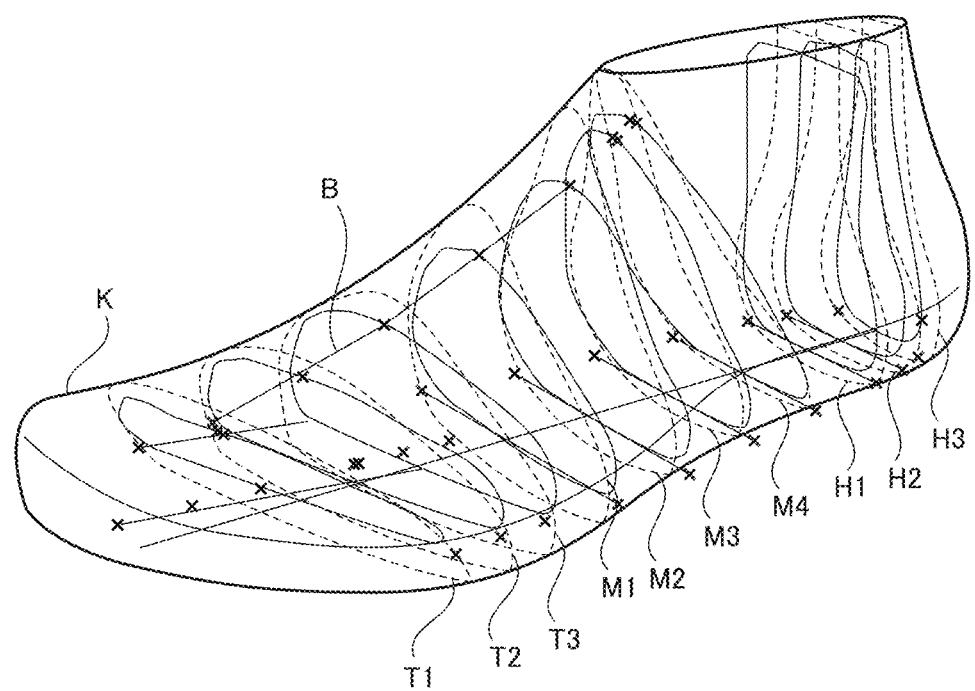
FIG. 7 shows the shoe last data on which the foot shape data is superimposed.

Referring again to FIG. 4, the data generating apparatus 100 specifies portions of shoe last data K to be corrected, which is computed in step S104, based on the additional information (step S105). The areas of the shoe shown in FIG. 5 are associated with the positions in the foot shape data and the shoe last data. FIG. 7 shows the shoe last data on which the foot shape data is superimposed. FIG. 7 shows a plurality of pieces of cross section information (cross sections T1 to T3, M1 to M4 and H1 to H3) and a plurality of pieces of baseline information (baselines B) connecting the cross sections, which are obtained from the foot shape data based on the homologous model. In FIG. 7, a plurality of pieces of cross section information and a plurality of pieces of baseline information corresponding to the foot shape data are indicated by a solid line, and a plurality of pieces of cross section information and a plurality of pieces of baseline information corresponding to the shoe last data are indicated by a broken line. FIG. 7 does not show all of the pieces of cross section information and the pieces of baseline information based on the homologous model, but shows a part of the pieces of cross section information and the pieces of baseline information.

Specifically, the toe area shown in FIG. 5 corresponds to the positions of cross sections T1 to T3 shown in FIG. 7, the midfoot portion area corresponds to the positions of cross sections M1 to M4, and the heel area corresponds to the positions of cross sections H1 to H3. Therefore, the data generating apparatus 100 can specify, as areas to be corrected, the areas other than the heel area input as "average", of the areas of the shoe shown in FIG. 5.

The data generating apparatus 100 calculates amounts of correction of the specified portions based on the additional information (step S106). Specifically, the data generating apparatus 100 increases the shape of the shoe last data at the positions of cross sections T1 to T3 by, for example, 3%, based on the additional information that "a little loose" is the user's preference about the shape of the toe area as shown in FIG. 5. The amounts of correction are preset. For example, when "a little loose" has been input as the additional information, the shape is increased by, for example, 3%. For example, when "a little tight" has been input as the additional information, the shape is decreased by, for example, 2%.

After calculating the amount of correction of the toe area, the data generating apparatus 100 determines whether or not the amounts of correction of all of the specified portions have been calculated (step S107). When the amounts of correction of all of the specified portions have not been calculated (NO in step S107), the data generating apparatus 100 returns the process to step S106 and calculates the amounts of correction of the remaining specified portions. Specifically, the data generating apparatus 100 decreases the shape of the shoe last data at the positions of cross sections H1 to H3 by, for example, 2%, based on the additional information that "a little tight" is the user's preference about the shape of the heel area as shown in FIG. 5.

After the amount of correction of the heel area is calculated, it is determined that the amounts of correction of all of the specified portions have been calculated (YES in step S107). Therefore, the data generating apparatus 100 computes the shoe last data including the specified portions corrected in accordance with the calculated amounts of correction (step S108). Specifically, the data generating apparatus 100 increases the shape of shoe last data K (computed in step S104) at the positions of cross sections T1 to T3 by, for example, 3%, and decreases the shape of shoe last data K at the positions of cross sections H1 to H3 by, for example, 2%.

The data generating apparatus 100 outputs, to the shoe last producing apparatus 400, the corrected shoe last data that is a result of computation by the computing unit (step S109). The shoe last data output to the shoe last producing apparatus 400 is shoe last data in which the information on the user's preference about the shape of the shoe is reflected. Therefore, when a custom-made shoe is manufactured using a shoe last produced based on the shoe last data, the shoe can have a fitting feeling that satisfies the user.

As described above, the data generating apparatus 100 according to the first embodiment generates shoe last data for manufacturing a shoe from measured foot shape data. The data generating apparatus 100 includes: the input unit 106 that receives the foot shape data; the processor 102 (computing unit) that computes the shoe last data from the foot shape data received by the input unit 106; and the output unit 108 that outputs the shoe last data computed by the processor 102. The input unit 106 further receives selected additional information. The processor 102 specifies a portion of the shoe last data to be corrected, based on the additional information, and calculates an amount of correction of the specified portion based on the additional information. The shoe last producing system 10 includes: the measuring apparatus 200 that measures a foot shape and outputs the foot shape data to the data generating apparatus 100; the data generating apparatus 100 described above; and the shoe last producing apparatus 400 that produces a shoe last based on the shoe last data generated by the data generating apparatus 100.

Thus, the data generating apparatus 100 according to the first embodiment can generate the shoe last data for manufacturing the shoe having a fitting feeling that satisfies the user. In addition, since the shoe last producing system 10 manufactures the shoe using the shoe last produced based on the shoe last data generated by the data generating apparatus 100, the shoe last producing system 10 can manufacture the shoe having a fitting feeling that satisfies the user.

The shoe last data preferably includes at least one of upper data (first data) corresponding to an upper-side region of the shoe and sole data (second data) corresponding to a sole-side region of the shoe. For example, when shoes including soles of the same shape are manufactured, the sole data can be shared. In addition, the processor 102 preferably specifies a portion of the upper data to be corrected. This makes it possible to limit the portion to be corrected to the upper side. Furthermore, the processor 102 preferably selects one of a plurality of pieces of preset sole data as the sole data. This makes it possible to reduce the processing burden of the processor 102, as compared with the case of generating the sole data from the foot shape data by computation.

The data generating apparatus 100 preferably further includes the storage 110 that prestores a plurality of pieces of the shoe last data. The processor 102 may select one of the plurality of pieces of the shoe last data stored in the storage 110, based on the foot shape data, and specify a portion of the selected piece of the shoe last data to be corrected. This makes it possible to reduce the processing burden of the processor 102, as compared with the case of generating the shoe last data from the foot shape data by computation.

The foot shape data is preferably data based on a model created by dividing a foot shape into a plurality of prescribed cross sections, and connecting a plurality of representative points specified within the cross sections. This makes it possible to reduce an amount of the foot shape data transmitted from the measuring apparatus 200 to the data generating apparatus 100. The foot shape data is preferably data based on a homologous model. When the measuring apparatus 200 and the mobile terminal 300 cannot perform conversion into the data based on the homologous model, the processor 102 may convert the foot shape data received by the input unit 106 into the data based on the homologous model.

The processor 102 preferably obtains a plurality of pieces of cross section information and a plurality of pieces of baseline information connecting the cross sections, from the foot shape data based on the homologous model, and specifies a portion of the shoe last data to be corrected, with respect to the obtained pieces of cross section information or the obtained pieces of baseline information. This makes it possible to specify the portion of the shoe last data to be corrected in association with the foot shape data based on the homologous model.

A data generating method for generating shoe last data according to the first embodiment includes: receiving the foot shape data (S101); further receiving selected additional information (S102); computing the shoe last data from the foot shape data (S104); specifying a portion of the shoe last data to be corrected, based on the additional information (S105); calculating an amount of correction of the specified portion based on the additional information (S106); computing the shoe last data including the specified portion corrected in accordance with the calculated amount of correction (S108); and outputting the computed shoe last data (S109). Thus, the data generating method for generating shoe last data according to the first embodiment can generate the shoe last data for manufacturing the shoe having a fitting feeling that satisfies the user.

Second Embodiment

In the first embodiment, the description has been given of the example in which the data generating apparatus 100 generates the shoe last data in which the information about user's preference, of the information about the shape of the shoe, is reflected. In a second embodiment, another example of the additional information reflected in the shoe last data will be described. Since a shoe last producing system and a data generating apparatus according to the second embodiment have the same configuration as that of the shoe last producing system 10 and the data generating apparatus 100 according to the first embodiment, the shoe last producing system and the data generating apparatus according to the second embodiment are denoted by the same reference characters as those of the shoe last producing system 10 and the data generating apparatus 100 according to the first embodiment, and a detailed description will not be repeated.

FIG. 8 shows a list of the additional information reflected in the shoe last data. The additional information shown in FIG. 8 does not indicate the whole of the additional information reflected in the shoe last data, and other information may be reflected in the shoe last data. The additional information can be divided into information about a shape of a shoe, information about the use of a shoe, and information about a foot of a user, based on its contents. The information about the shape of the shoe includes information about user's preference, information about a shoe used by a user, existing shoe last data, information about a shape of a wearing opening, information about a material of an upper, information about a shape of a sole, and the like. The information about the use of the shoe includes running data, information about a sport in which a shoe is used, and the like. The information about the foot of the user includes information about a pressure of an instep portion, information about a plantar pressure, information about deformation of a foot shape, and the like.

The additional information can also be divided into factual information and selective information, based on its contents. The factual information refers to objective information, and refers to information that can be represented by numerical data, such as length, pressure and speed. The selective information refers to subjective information for the user, and refers to information selected based on, for example, an interview with the user, such as a little loose, a little tight, fast, and slow.

The additional information will be described in more detail individually. An example of the information about user's preference is information about user's taste, such as information that "a little loose" toe is the user's taste as described with reference to FIG. 5. The information about user's taste is selective information that can be collected by an interview with the user, and can be obtained by causing the user to input the user's taste for each area of the shoe into the mobile terminal 300 as shown in FIG. 5.

An example of the information about the shoe used by the user is information about existing shoe preference. The information about existing shoe preference is selective information that can be collected by an interview with the user, and is, for example, information that the existing shoe is "A product" having a size of 27 cm, and the heel and the midfoot portion of "A product" are just right for the user while the toe of "A product" is slightly tight. By preliminarily associating the terms such as "heel" and "midfoot portion" included in the information about existing shoe preference with the portions in the shoe data, and preliminarily associating the terms such as "slightly tight" and "loose" included in the information about existing shoe preference with the amounts of correction of the shoe data, the data generating apparatus 100 can specify the portions of the shoe last data to be corrected, based on the additional information, and calculate the amounts of correction of the specified portions.

An example of the information about the shoe used by the user is information about 3D data of an existing shoe. The information about 3D data of the existing shoe is factual information such as objective numerical data, and is, for example, shoe last data of "A product" that is the existing shoe. The shoe last data of the existing shoe may be data obtained by measuring the existing shoe through 3D measurement. The data generating apparatus 100 compares the shoe last data generated from the foot shape data with the shoe last data of "A product", specifies a portion having a difference exceeding a prescribed range, and calculates an amount of correction such that the difference falls within the prescribed range.

An example of the existing shoe last data is previously-generated last (shoe last) data. The previously-generated last data is factual information such as objective numerical data. The data generating apparatus 100 compares the shoe last data generated from the foot shape data with the previously-generated last (shoe last) data, specifies a portion having a difference exceeding a prescribed range, and calculates an amount of correction such that the difference falls within the prescribed range.

Figure 9:
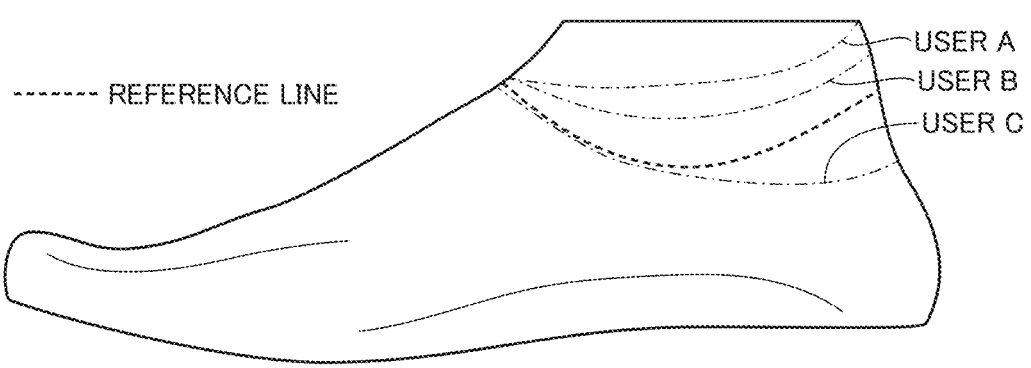
FIG. 9 shows a shoe last into which a user's favorite height of a wearing opening is written.

An example of the information about the shape of the wearing opening is information about a height of a wearing opening. The information about the height of the wearing opening is selective information that can be collected by an interview with the user. FIG. 9 shows a shoe last into which a user's favorite height of a wearing opening is written. A broken line shown in FIG. 9 indicates a reference line of the wearing opening, and the information is collected by causing the user to write the user's favorite height of the wearing opening into the shoe last having the reference line. When the favorite height of the wearing opening is higher than the reference line (user A, user B), the data generating apparatus 100 sets the wearing opening and its surroundings of the shoe last data to have a larger size in order to reduce the difficulty of wearing the shoe. Conversely, when the favorite height of the wearing opening is lower than the reference line (user C), the data generating apparatus 100 sets the wearing opening and its surroundings of the shoe last data to have a smaller size in order to reduce the easiness of coming-off of the shoe.

An example of the information about the material of the upper is information such as a knit material, a mesh material, artificial leather, non-woven fabric, or a heat-shrinkable material. The information about the material of the upper is selective information that can be collected by an interview with the user. When a stretchy material such as the knit material is, for example, selected, the data generating apparatus 100 calculates an amount of correction based on a shrinkage rate of the knit material, and adjusts the overall size of the shoe last data to a little smaller size in accordance with the amount of correction. When the heat-shrinkable material is, for example, selected, the data generating apparatus 100 adjusts the shape of the heel portion of the shoe last data.

Figure 10:
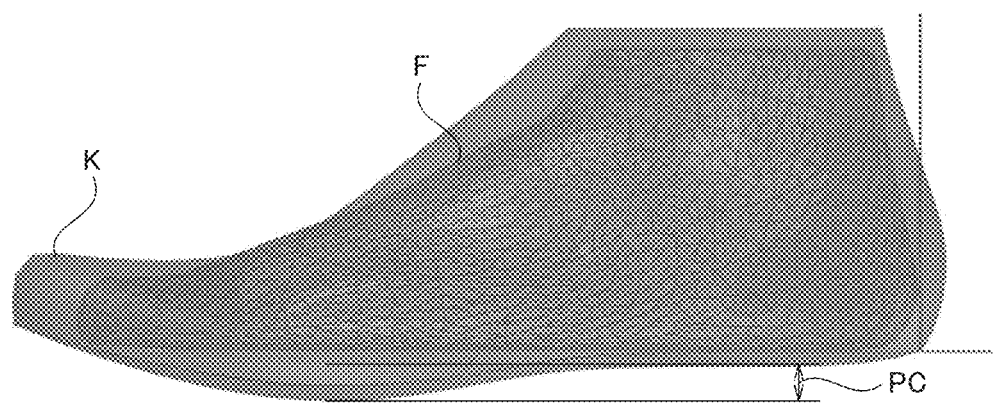
FIG. 10 shows a difference between a thickness of a sole of a heel and a thickness of a sole of a front foot portion.

An example of the information about the shape of the sole is information about a difference (PC) between a thickness of a sole of a heel and a thickness of a sole of a forefoot portion. The information about the PC is factual information such as objective numerical data, and the PC is 10 mm, for example. FIG. 10 shows a difference between a thickness of a sole of a heel and a thickness of a sole of a forefoot portion. Since the user stands on the measuring apparatus 200 to measure a foot shape, foot shape data F has a flat bottom surface as shown in FIG. 10. However, when the PC is 10 mm, the data generating apparatus 100 makes a correction to transform shoe last data K in accordance with the PC. An algorithm for transforming shoe last data K in accordance with the PC is preset in the data generating apparatus 100, and thus, the data generating apparatus 100 specifies a portion of shoe last data K to be corrected, based on the algorithm, and calculates an amount of correction of the specified portion.

An example of the running data included in the information about the use of the shoe is information such as a running pitch, a running stride and a running speed of the user. The running data is factual information such as objective numerical data obtained from an app of a smartphone, a smartwatch or the like, a sensing device worn during running, or the like. However, the running data may be selective information that can be collected by an interview with the user, such as "fast" or "slow". A step length per one step of a user having a large stride is longer than that of a user having a small stride. Therefore, the user having a large stride is likely to experience a gap between the foot and the shoe during running because a large load is applied to the shoe. In contrast, the user having a small stride is less likely to experience a gap between the foot and the shoe during running because the user contacts the ground in small steps. In consideration of a user's physique, the data generating apparatus 100 determines from the running data whether the stride is larger or smaller than an average value, and when the stride is larger, the data generating apparatus 100 adjusts the overall size of the shoe last data to a little smaller size. Specifically, when a ratio of (length of stride)/(height) is higher than a prescribed ratio, the data generating apparatus 100 decreases the overall size of the shoe last data by, for example, 2%.

An example of the information about the sport in which the shoe is used is information about a target sport. The information about the target sport is selective information that can be collected by an interview with the user, and is, for example, information such as soccer, basketball or walking. When soccer is, for example, input as the information about the target sport, the data generating apparatus 100 adjusts the overall size of the shoe last data to a little smaller size, because soccer is a sport in which the movement in the front-back direction and in the right-left direction is frequent. When walking is, for example, input as the information about the target sport, the data generating apparatus 100 adjusts the overall size of the shoe last data to a little larger size, because walking is a sport in which the main movement is in the front-back direction and the movement speed is low.

An example of the information about the sport in which the shoe is used is information about a target speed. The information about the target speed is factual information such as objective numerical data. However, the information about the target speed may be selective information that can be collected by an interview with the user, such as "fast" or "slow". As the running speed of the user becomes faster, a gap between the foot and the shoe becomes more likely to occur. In addition, the user tends to tie a shoelace more tightly. Therefore, the data generating apparatus 100 adjusts the overall size of the shoe last data to a little smaller size.

An example of the information about the pressure of the instep portion included in the information about the foot of the user is information about a compression pressure obtained by a pressure sensor provided at the instep portion. The information about the compression pressure is factual information such as objective numerical data, and is, for example, pressure data measured by a pressure sensor when the user wearing a test shoe including the pressure sensor at an instep portion runs. The data generating apparatus 100 corrects the shoe last data in consideration of contact of the upper with the instep portion. Specifically, when a compression pressure in cross section M1 is higher than a prescribed pressure, the data generating apparatus 100 increases the shape of the shoe last data at the position of cross section M1 by, for example, 3%, and when a compression pressure in cross section T2 is lower than the prescribed pressure, the data generating apparatus 100 decreases the shape of the shoe last data at the position of cross section T2 by, for example, 2%.

An example of the information about the plantar pressure is plantar pressure data measured by a pressure sensor when the user wearing a test shoe runs. The information about the plantar pressure is factual information such as objective numerical data. When plantar pressure data of the midfoot portion area is higher than a prescribed pressure, the data generating apparatus 100 decreases the shape of the shoe last data at the positions of cross sections M1 to M4 of the midfoot portion area by, for example, 2%.

An example of the information about deformation of the foot shape is information about pronation. The pronation refers to such a movement that a foot contacts the ground from the outside of a heel and the heel falls inward and an inner arch collapses during running. As the information about pronation, an angle of the heel with respect to the foot (pronation angle) at the time of contacting the ground is, for example, measured. The pronation angle is factual information such as objective numerical data. When the pronation angle is greater than, for example, 10 degrees, the data generating apparatus 100 decreases the shape of the shoe last data at the positions of cross sections M1 to M4 of the midfoot portion area by, for example, 2%. Another example of the information about deformation of the foot shape is information about a foot shape when the user has a weight, or information about a foot shape when the user raises the heel.

As described above, the additional information preferably includes at least one of factual information and selective information selected by a user. The additional information preferably includes at least one of information about a shape of the shoe, information about use of the shoe, and information about a foot of a user. The information about the shape of the shoe preferably includes at least one of information about user's preference, information about the shoe used by the user, existing shoe last data, information about a shape of a wearing opening, information about a material of an upper, and information about a shape of a sole. The information about the use of the shoe preferably includes at least one of running data and information about a sport in which the shoe is used. The information about the foot of the user preferably includes at least one of information about a pressure of an instep portion, information about a plantar pressure, and information about deformation of a foot shape. As described above, at least one of various types of information is reflected in the shoe last data as the additional information, and thus, the shoe last data makes it possible to manufacture the shoe having a fitting feeling that satisfies the user, as compared with the shoe last produced simply based on the information about the foot size and the foot shape.

<Other Modifications>

Figure 11A:
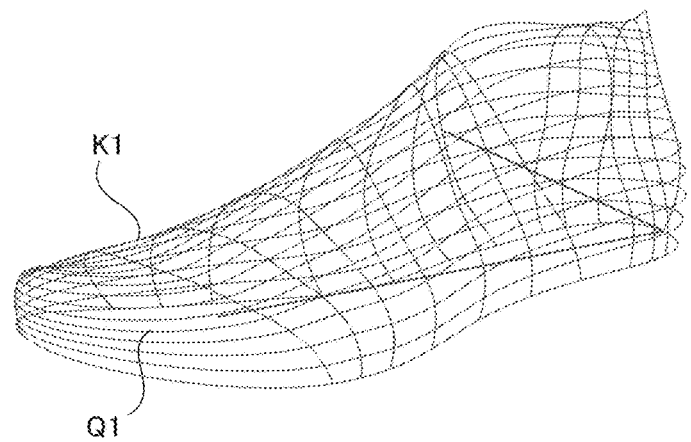
FIG. 11A is a schematic view of shoe last data K1.
Figure 11B:
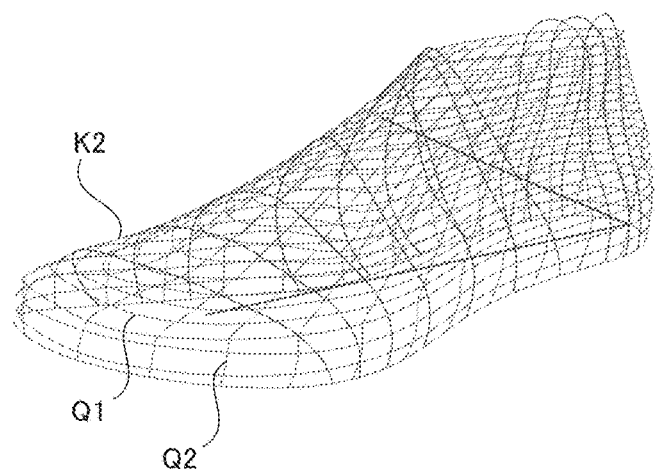
FIG. 11B is a schematic view of shoe last data K2.
Figure 11C:
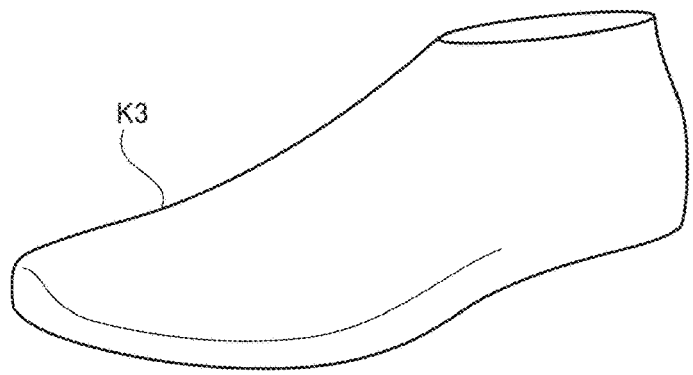
FIG. 11C is a schematic view of shoe last data K3.

(1) Although the data generating apparatus 100 may output, as the shoe last data, the data of the plurality of pieces of cross section information including the specified portions corrected from the foot shape data based on the homologous model, the data generating apparatus 100 may process the data to connect the cross sections and form a surface of a shoe last, and output the data as final shoe last data K. FIGS. 11A to 11C are schematic views showing how the data generating apparatus 100 generates surface information of the shoe last data connecting the cross sections, based on the plurality of pieces of corrected cross section information. In shoe last data K1 shown in FIG. 11A, a curved line Q1 is generated, the curved line Q1 connecting the plurality of pieces of cross section information (cross sections T1 to T3, M1 to M4 and H1 to H3) including the corrected specified portions, and extending from the toe to the heel of the shoe last. Furthermore, in shoe last data K2 shown in FIG. 11B, a curved line Q2 is generated, the curved line Q2 connecting the plurality of pieces of cross section information, and extending from the toe or heel to the wearing opening of the shoe last.

In shoe last data K3 shown in FIG. 11C, smooth surface information of the shoe last data connecting the curved lines generated in FIGS. 11A and 11B is generated. Although the quality of the surface information of the shoe last data depends on, for example, a program executed in the data generating apparatus 100, it is desirable to generate the surface information having a continuous normal vector and a continuous curvature.

Figure 12:
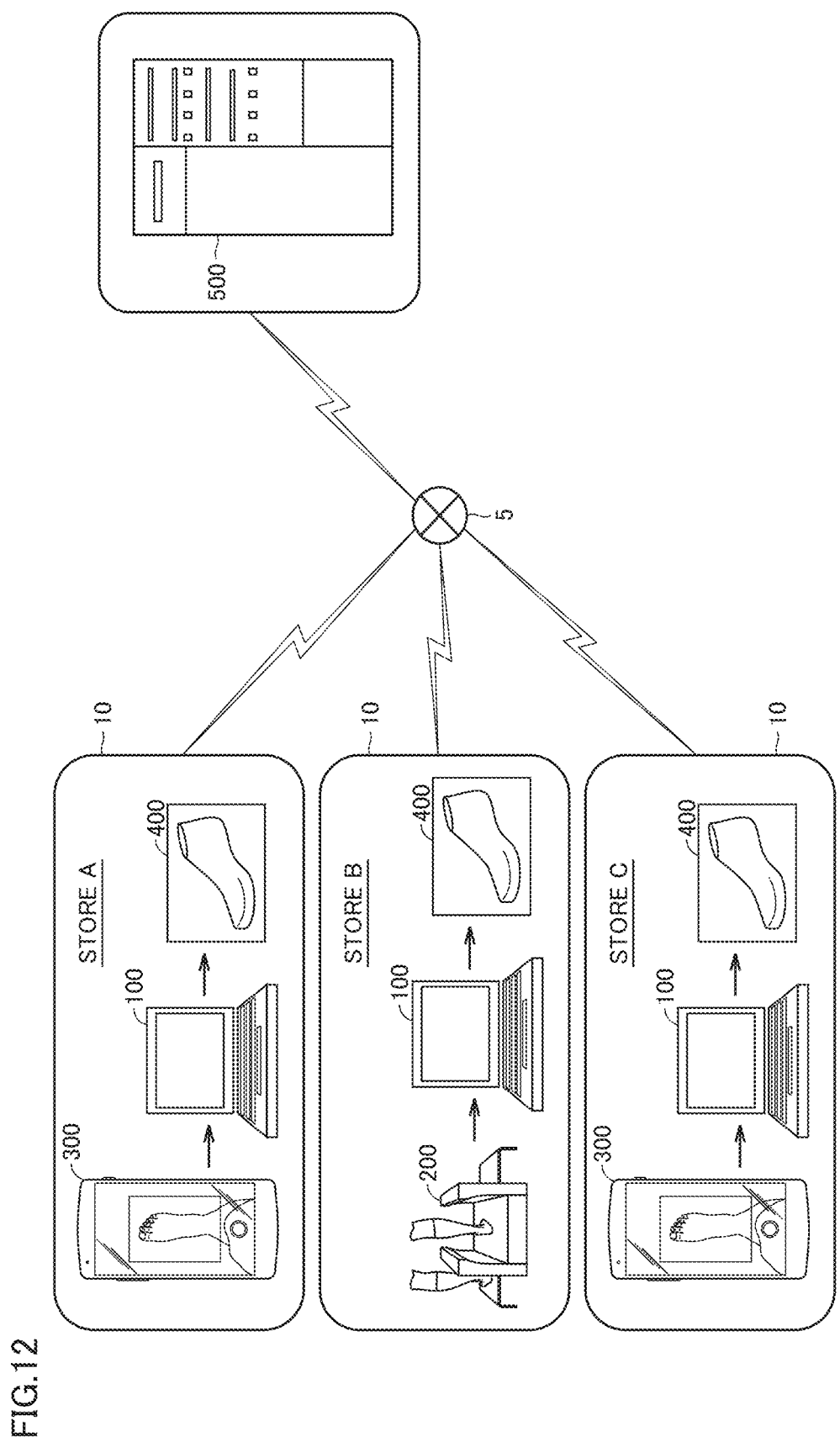
FIG. 12 is a schematic view showing a state in which shoe last producing systems at various stores are connected to a data server.

(2) The shoe last producing system 10 at one store including the data generating apparatus 100, the measuring apparatus 200 and the shoe last producing apparatus 400 has been described with reference to FIG. 1. However, the shoe last producing system 10 may include a store where the measuring apparatus 200 is not provided and a foot shape is measured using the mobile terminal 300 such as a smartphone. The shoe last producing system 10 may include a store where the shoe last producing apparatus 400 is not provided and a shoe last is produced using the shoe last producing apparatus 400 placed at another store to manufacture a shoe. FIG. 12 is a schematic view showing a state in which the shoe last producing systems at various stores are connected to the data server 500.

As shown in FIG. 12, the shoe last producing system 10 is arranged in each of a plurality of stores A to C. For example, store A and store C are small stores in a city. Inside store A and store C, a salesclerk captures an image of a foot of a user using the mobile terminal 300 to thereby obtain foot shape data using the mobile terminal 300, or store A and store C receive foot shape data measured at home or the like by the user himself/herself using the mobile terminal 300. In contrast, store B is a large store in a shopping mall or the like. Inside store B, a salesclerk measures a foot of a user using the measuring apparatus 200 to thereby obtain foot shape data. The foot shape data obtained in each of stores A to C is processed by the data generating apparatus 100 of each store, and may be stored in the data server 500 arranged in a manufacturer or the like through a network 5, together with user's personal information.

The manufacturer generates shoe last data and sole data of existing shoes and stores the shoe last data and the sole data in a shoe last database and a sole database in the data server 500. Since the shoe last data and the sole data of the existing shoes are stored in the shoe last database and the sole database in the data server 500, the data generating apparatus 100 provided at each store can select shoe last data close to the foot shape data from a library of the shoe last database, and select sole data selected by the user from a library of the sole database. In addition, based on information about a shoe used by the user, the data generating apparatus 100 can search for shoe last data and sole data of the shoe from the shoe last database and the sole database in the data server 500. The information stored in the data server 500 is not limited to the shoe last data and the sole data of the existing shoes, and the data server 500 may store running data of the user, shoe last data previously generated by the user, information about a sport in which the shoe is used, information about a material of an upper, and the like.

Instead of being arranged in the manufacturer different from the stores, the data server 500 may be arranged at another location or in a certain store. For example, the data server 500 may be arranged in any one of stores A to C. A plurality of shoe last producing systems 10 may be arranged in one store, or a local data server that can communicate with the plurality of shoe last producing systems 10 may be arranged in the one store. The data server 500 may be implemented in the form of a cloud service.

Although the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A data generating apparatus that generates shoe last data for manufacturing a shoe from measured foot shape data, the data generating apparatus comprising:
   an input configured to receive the foot shape data and additional information;
   a computer configured to compute the shoe last data from the foot shape data received by the input, specify a portion of the shoe last data to be corrected based on the additional information, calculate an amount of correction of the specified portion based on the additional information, and correct the specified portion by the amount of correction to correct the shoe last data, the additional information including selective tightness information selected by a user; and
   an output configured to output the shoe last data as computed and corrected by the computer,
   wherein the selective tightness information is selective based on a region of the shoe.

2. The data generating apparatus according to claim 1, wherein
   the shoe last data includes at least one of first data corresponding to an upper-side region of the shoe and second data corresponding to a sole-side region of the shoe.

3. The data generating apparatus according to claim 2, wherein
   the computer is configured to specify a portion of the first data to be corrected.

4. The data generating apparatus according to claim 3, wherein
   the computer is configured to select one of a plurality of pieces of preset sole data as the second data.

5. The data generating apparatus according to claim 3, further comprising:
   a storage configured to prestore a plurality of pieces of the shoe last data, wherein
   the computer is configured to
     select one of the plurality of pieces of the shoe last data stored in the storage, based on the foot shape data, and
     specify a portion of the selected piece of the shoe last data to be corrected.

6. The data generating apparatus according to claim 2, wherein
   the computer is configured to select one of a plurality of pieces of preset sole data as the second data.

7. The data generating apparatus according to claim 2, further comprising:
   a storage configured to prestore a plurality of pieces of the shoe last data, wherein
   the computer is configured to
     select one of the plurality of pieces of the shoe last data stored in the storage, based on the foot shape data, and
     specify a portion of the selected piece of the shoe last data to be corrected.

8. The data generating apparatus according to claim 1, further comprising:
   a storage configured to prestore a plurality of pieces of the shoe last data, wherein
   the computer is configured to
     select one of the plurality of pieces of the shoe last data stored in the storage, based on the foot shape data, and
     specify a portion of the selected piece of the shoe last data to be corrected.

9. The data generating apparatus according to claim 1, wherein
   the foot shape data is data based on a model created by dividing a foot shape into a plurality of prescribed cross sections, and connecting a plurality of representative points specified within the cross sections.

10. The data generating apparatus according to claim 9, wherein
    the foot shape data is data based on a homologous model.

11. The data generating apparatus according to claim 10, wherein
    the computer is configured to convert the foot shape data received by the input into the data based on the homologous model.

12. The data generating apparatus according to claim 10, wherein
    the computer is configured to
      obtain a plurality of pieces of cross section information and a plurality of pieces of baseline information connecting cross sections, from the foot shape data based on the homologous model, and
      specify a portion of the shoe last data to be corrected, with respect to the obtained pieces of cross section information or the obtained pieces of baseline information.

13. The data generating apparatus according to claim 12, wherein
    the computer is configured to generate surface information of the shoe last data connecting cross sections, based on a plurality of pieces of cross section information of the corrected shoe last data.

14. The data generating apparatus according to claim 1, wherein
    the additional information includes at least one of factual information and selective information selected by the user.

15. The data generating apparatus according to claim 1, wherein
    the additional information includes at least one of information about a shape of the shoe, information about use of the shoe, and information about a foot of the user.

16. The data generating apparatus according to claim 15, wherein
    the information about the shape of the shoe includes at least one of information about user's preference, information about the shoe used by the user, existing shoe last data, information about a shape of a wearing opening, information about a material of an upper, and information about a shape of a sole.

17. The data generating apparatus according to claim 15, wherein
    the information about the use of the shoe includes at least one of running data and information about a sport in which the shoe is used.

18. The data generating apparatus according to claim 15, wherein
    the information about the foot of the user includes at least one of information about a pressure of an instep portion, information about a plantar pressure, and information about deformation of a foot shape.

19. A shoe last producing system comprising:
   a measuring apparatus configured to measure a foot shape and output the foot shape data to the data generating apparatus as recited in claim 1; and
   a shoe last producing apparatus configured to produce a shoe last based on the shoe last data generated by the data generating apparatus.

20. A data generating method for generating shoe last data for manufacturing a shoe from measured foot shape data, the data generating method comprising:
   receiving the foot shape data;
   further receiving selected additional information, the additional information including selective tightness information selected by a user;
   computing the shoe last data from the foot shape data;
   specifying a portion of the shoe last data to be corrected, based on the additional information;
   calculating an amount of correction of the specified portion based on the additional information;
   computing the shoe last data including the specified portion corrected in accordance with the calculated amount of correction; and
   outputting the computed shoe last data including the specified portion corrected,
   wherein the selective tightness information is selective based on a region of the shoe.

* * * * *